United States Patent [19]

Hasegawa

[11] Patent Number: 4,606,424
[45] Date of Patent: Aug. 19, 1986

[54] POWER STEERING APPARATUS

[75] Inventor: Akira Hasegawa, Toyota, Japan

[73] Assignee: Toyota Jidosha Kabushiki Kaisha, Toyota, Japan

[21] Appl. No.: 673,932

[22] Filed: Nov. 21, 1984

[30] Foreign Application Priority Data

Nov. 21, 1983 [JP] Japan ............................. 58-219309

[51] Int. Cl.$^4$ .............................................. B62D 5/08
[52] U.S. Cl. .................................. 180/143; 91/375 A
[58] Field of Search ....................... 180/143, 148, 141; 91/375 A, 434

[56] References Cited

U.S. PATENT DOCUMENTS

| | | | |
|---|---|---|---|
| 3,465,842 | 9/1969 | Hruska | 91/375 A |
| 3,930,554 | 1/1976 | Ward | 91/375 A |
| 4,034,825 | 7/1977 | Adams | 180/143 |
| 4,373,598 | 2/1983 | Elser | 180/143 |
| 4,481,866 | 11/1984 | Matouka | 91/375 A |

FOREIGN PATENT DOCUMENTS 966431 8/1964 United Kingdom ............. 91/375 A

Primary Examiner—John J. Love
Assistant Examiner—Mark C. Dukes
Attorney, Agent, or Firm—Oblon, Fisher, Spivak, McClelland & Maier

[57] ABSTRACT

A power steering apparatus which includes an input member rotatably mounted in a valve housing, an output member rotatably mounted in a gear housing integral with the valve housing and arranged coaxially with the input member, a valve rotor integral with the input member, a valve sleeve rotatably mounted in the valve housing and arranged in surrounding relationship with the valve rotor, the valve sleeve being connected integrally with the output member to cooperate with the valve rotor for selectively directing fluid under pressure to opposite ends of a hydraulic power cylinder in response to relative rotation between the input and output members, a cam follower element axially movable in an internal axial bore in the output member and being engaged at one end thereof with the inner end of the input member for permitting relative rotation of the input and output members upon the application of a predetermined torque to the input member, and a pressure mechanism arranged to apply fluid under pressure responsive to the vehicle speed to the other end of the cam follower element for effecting the resistance to relative rotation of the input and output members in accordance with an increase in vehicle speed.

8 Claims, 2 Drawing Figures

POWER STEERING APPARATUS

BACKGROUND OF THE INVENTION

1. Field of the Invention

The present invention relates to a power steering apparatus for providing a hydraulic power assist to the driver's steering effort applied to the steering wheel of an automotive vehicle, and more particularly to a power steering apparatus of the type which is capable of decreasing the hydraulic power assist in accordance with an increase in vehicle speed.

2. Discussion of the Background

As one of power steering apparatuses of this kind, a power steering apparatus of the rotary valve type has been proposed in the U.S. Pat. No. 4,034,825 issued on July 12, 1977, which power steering apparatus comprises a valve housing, an input member in the form of an inner rotating valve sleeve rotatably mounted in the valve housing, an output member arranged coaxially with the input member for relative rotation, and an outer valve sleeve rotatably coupled over the inner valve sleeve and connected integrally with the output member to cooperate with the inner valve sleeve in response to relative rotation between the input and output members thereby to selectively direct fluid under pressure from a source of hydraulic pressure to opposite ends of a hydraulic power cylinder. In this prior proposal, a torsion bar is adapted to interconnect the input and output members for permitting relative rotation between the input and output members, a pair of axial recesses are formed in the inner valve sleeve, and a pair of balls are positioned in the axial recesses and caged in a pair of radial bores in the thick end part of the outer valve sleeve to effect the resistance to relative displacement between the inner and outer valve sleeves. The balls are further arranged to be subject to hydraulic pressure from a secondary hydraulic pump responsive to the vehicle speed. Thus, the balls act to increase the resistance to relative displacement between the inner and outer valve sleeves in proportion to the vehicle speed. In such arrangement, the assembly of the input and output members in the valve housing is complicated due to provision of the torsion bar. Additionally, it is required to maintain the hydraulic pressure applied to the balls at a high level for effecting the resistance to relative rotation between the inner and outer valve sleeves, thus resulting in power loss of the prime mover of the vehicle.

SUMMARY OF THE INVENTION

It is therefore a primary object of the present invention to provide a power steering apparatus wherein a cam mechanism is adapted to permit relative rotation between input and output members without provision of such a torsion bar as described above, and wherein the cam mechanism is arranged to be applied with a hydraulic pressure from a source of fluid under pressure responsive to the vehicle speed for effecting the resistance to relative rotation between the input and output members in accordance with an increase in vehicle speed.

Another object of the present invention is to provide a power steering apparatus, having the above-described characteristics, wherein the hydraulic pressure applied to the cam mechanism can be maintained at a relatively low level.

A further object of the present invention is to provide a power steering apparatus, having the above-described characteristics, the torsional rigidity of which is reliably ensured in a simple construction.

A still another object of the present invention is to provide a power steering apparatus, having the above-described characteristics, caplable of adjusting in a simple manner a hydraulic power assist to the driver's steering effort applied to the steering wheel.

According to the present invention there is provided a power steering apparatus for an automotive vehicle including a primary source of fluid under pressure, a secondary source of fluid under pressure responsive to the vehicle speed for supply of fluid under pressure in proportion to the vehicle speed, and a hydraulic power cylinder for providing hydraulic power assistance to the driver's steering effort applied to the steering wheel of the vehicle. The power steering apparatus comprises a housing, an input member rotatably mounted in the housing, an output member rotatably mounted in the housing and arranged coaxially with the input member for relative rotation, a valve rotor integral with the input member, a valve sleeve rotatably mounted in the housing and arranged in surrounding relationship with the valve rotor, the valve sleeve being connected integrally with the output member to cooperate with the valve rotor for selectively directing fluid under pressure from the primary source to opposite ends of the power cylinder in response to relative rotation between the input and output members, a cam mechanism including a cam follower element axially movable in an internal axial bore in the output member and being engaged at one end thereof with the inner end of the input member in such a manner as to permit relative rotation of the input and output members and to effect axial movement of the cam follower element upon the application of a predetermined torque to the input member, and a pressure mechanism arranged to apply a hydraulic pressure from the secondary source to the other end of the cam follower element for increasing the resistance to relative rotation between the input and output members in accordance with an increase in vehicle speed.

In the actual practice of the present invention, it is preferable that the cam follower element consists of a cam piece axially movable in the inner end portion of the internal axial bore in the output member and rotatable integrally with the output member, and a rod portion integral with the cam piece and axially movable in the internal axial bore in the output member, the cam piece being formed with a pair of solid cam surfaces, and the input member being formed in its inner end with a pair of recessed cam surfaces which confront with the solid cam surfaces, and the rod portion being arranged to be applied at the outer end thereof with a hydraulic pressure from the secondary source of fluid under pressure responsive to the vehicle speed. It is further preferable that the pressure mechanism comprises a piston axially slidable in an end portion of the housing and being operatively engaged with the outer end of the rod portion of the cam follower element, and a closure member detachably coupled within the end portion of the housing to associate with the piston to define a pressure chamber in communication with the secondary source. It is also preferable that the pressure mechanism further comprises a resilient member supported on the inner end of the closure member and being in engagement with the piston to bias the cam follower element toward the input member for applying an initial resistance to relative rotation between the input and output members.

BRIEF DESCRIPTION OF THE DRAWINGS

Other objects and attendant advantages of the present invention will become more readily apparent from the following detailed description of a preferred embodiment thereof when considered in connection with the attached drawings in which.

DESCRIPTION OF THE PREFERRED EMBODIMENT

Figure 1:
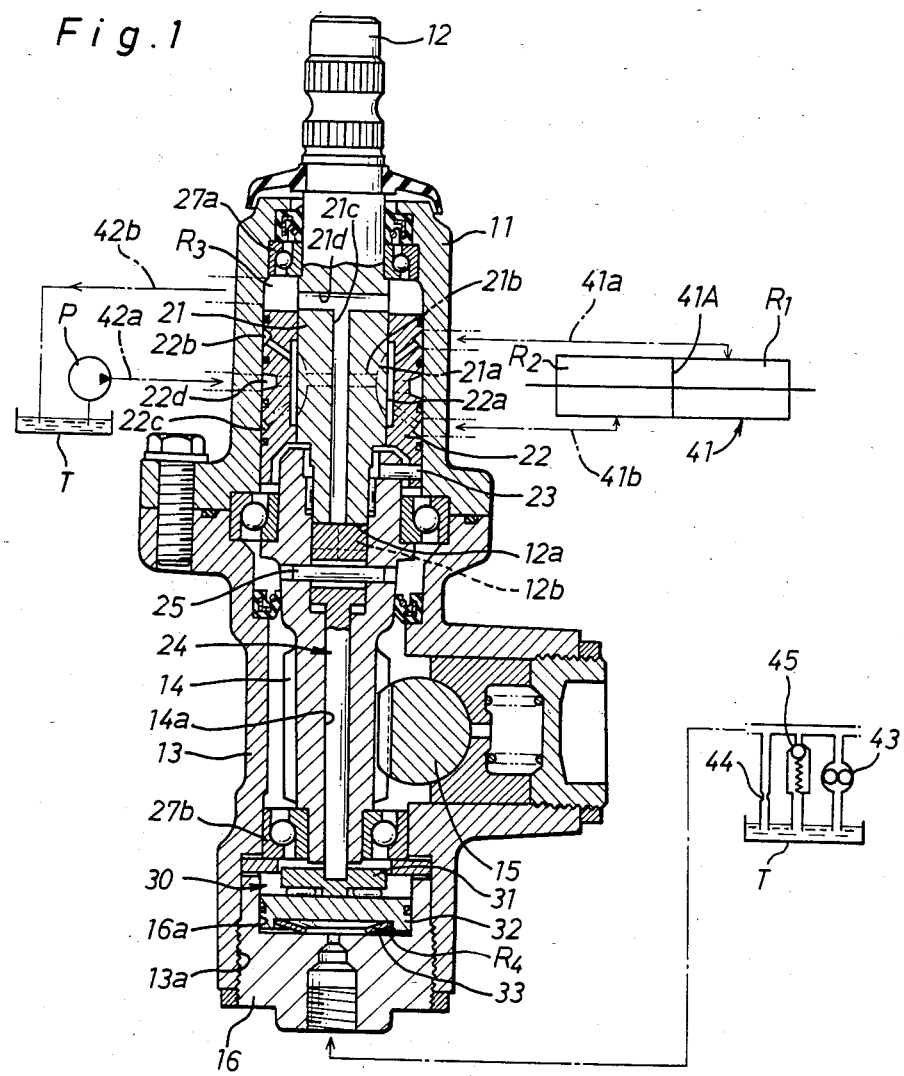
FIG. 1 illustrates in cross sectional form a power steering apparatus in accordance with the present invention.

Referring now to the drawings, there is illustrated a power steering apparatus of the rack and pinion type in accordance with the present invention. The power steering apparatus includes a valve housing 11 that has an input member or shaft 12 rotatably mounted therein by means of a ball bearing 27a. The valve housing 11 is formed integrally with a gear housing 13 that has an output member 14 in the form of a pinion shaft rotatably mounted therein by means of a pair of ball bearings 27b, 27b. The input and output members 12 and 14 are coaxially arranged and coupled at their inner ends through a cam follower element 24 for relative rotation. The input member 12 is adapted to be connected to the steering shaft and steering wheel (not shown) of the automotive vehicle in which the power steering apparatus is mounted. The output member or pinion shaft 14 is permanently in mesh with a rack member 15 which is connected to a power piston 41A in a hydraulic power cylinder 41 as is schematically illustrated in the figure. The rack member 15 is further operatively connected to the steerable road wheels of the vehicle through a standard linkage mechanism (not shown).

An intermediate portion of the input member 12 is formed as a valve rotor 21 which is coupled within a valve sleeve 22 for relative rotation. The valve rotor 21 is formed in its outer circumference with a plurality of circumferentially equi-spaced axial grooves 21a of semicircular cross-section and is formed therein with a plurality of radial passages 21b which communicate a part of the axial grooves 21a into an internal axial bore 21c in the input member 12. The valve rotor 21 is further formed therein with a radial passage 21d which extends across the outer end of internal axial bore 21c and is located above the valve sleeve 22. The valve sleeve 22 is arranged in surrounding relationship with the valve rotor 21 and connected to the inner end of output member 14 by means of a lateral pin 23. Thus, the valve sleeve 22 cooperates with the valve rotor 21 to provide a standard rotary change-over valve.

In the above arrangement, the valve sleeve 22 is formed in its inner circumference with a plurality of circumferentially equi-spaced axial grooves 22a and formed in its outer circumference with first and second annular grooves 22b and 22c. A part of axial grooves 22a is in open communication with the first annular groove 22b, while the other part of axial grooves 22a is in open communication with the second annular groove 22c. The first annular groove 22b is connected to a right-hand pressure chamber $R_1$ in power cylinder 41 by way of a hydraulic fluid circuit 41a, while the second annular groove 22c is connected to a left-hand pressure chamber $R_2$ in power cylinder 41 by way of a hydraulic fluid circuit 41b. The valve sleeve 22 is further formed in its outer circumference with a third annular groove 22d which is connected through a hydraulic fluid circuit 42a to a primary source of fluid under pressure in the form of a hydraulic pump P driven by a prime mover of the vehicle. The third annular groove 22d is alternately in open communication with the internal axial grooves 22a in a usual manner. A fluid chamber $R_3$ defined by the upper end of valve sleeve 22 is in open communication with the internal axial bore 21c through radial passage 21d and is connected to a reservoir tank T by way of a hydraulic fluid circuit 42b.

When relative rotation occurs between the input member 12 and the output member 14, fluid under pressure from the primary source of fluid under pressure is supplied into the third annular groove 22d in valve sleeve 22 by way of the fluid circuit 42a and is selectively supplied to one of the pressure chambers $R_1$ and $R_2$ in power cylinder 41 across one part of the axial grooves 22a, one of the annular grooves 22b and 22c, and one of the fluid circuits 41a and 41b, while the exhaust fluid from the other pressure chamber $R_2$ or $R_1$ in power cylinder 41 is discharged into the reservoir tank T by way of the other fluid circuit 41b or 41a, annular groove 22c or 22b, radial passages 21b, internal axial bore 21c, radial passage 21d and fluid circuit 42b. This will provide a hydraulic power assist to the driver's steering effort applied to the steering wheel during turning maneuvers of the vehicle.

Figure 2:
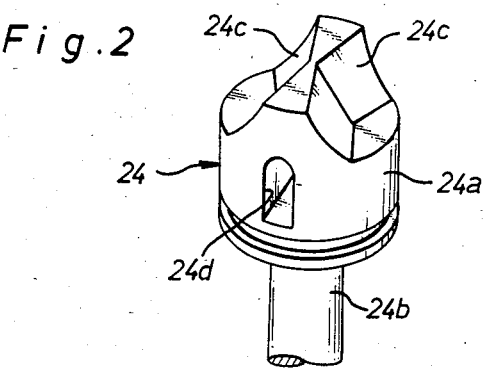
FIG. 2 is a perspective view of a cam follower element assembled in the power steering apparatus.

In the power steering apparatus, it should be noted that the cam follower element 24 is provided to permit relative rotation between the input and output members 12 and 14 under a variable pressure applied thereto from a pressure mechanism 30 as is described hereinafter. As can be well seen in FIGS. 1 and 2, the cam follower element 24 consists of a columnar cam piece 24a and a rod portion 24b extending from the bottom of columnar cam piece 24a. The columnar cam piece 24a is formed at its head with a pair of solid cam surfaces 24c, 24c and formed therein with a lateral through hole 24d of elongated cross-section. The columnar cam piece 24a and its rod portion 24b are axially slidably disposed in a fluid-tight manner within an axial stepped bore 14a in output member 14. In this arrangement, a lateral pin 25 is inserted into the lateral through hole 24d in columnar cam piece 24a and fixed at its opposite ends to the inner end of output member 14 in such a way to permit axial movement of the columnar cam piece 24a and its rod portion 24b. The input member 12 is formed in its inner end 12a with a pair of recessed cam surfaces 12b, 12b which confront with the solid cam surfaces 24c, 24c of columnar cam piece 24a. The gear housing 13 is formed in its lower portion with an opening 13a which is closed in a fluid-tight manner by a closure member or plug 16 detachably threaded therein.

The pressure mechanism 30 comprises a thrust plate 31, a piston 32 and a dish spring 33 mounted in the lower opening 13a. The thrust plate 31 is rotatably supported on the piston 32 by means of a needle bearing and is in engagement with the outer end of rod portion 24b of cam follower element 24. The piston 32 cooperates with the closure member 16 to define a variable pressure chamber $R_4$. The dish spring 33 is supported on the inner end of closure member 16 to bias the cam follower element 24 axially inwards through the thrust plate 31 and piston 32 to thereby eliminate lost motion or backlash in engagement between the recessed cam surfaces 12b, 12b and the solid cam surfaces 24c, 24c. The dish spring 33 can be replaced with another dish spring by removal of the closure plug 16. The pressure chamber $R_4$ is connected to a secondary source of fluid under pressure responsive to the vehicle speed, which source may comprise a hydraulic pump 43 driven by a propeller shaft of the vehicle, a manually adjustable orifice means 44 for regulating an initial hydraulic pressure applied to the pressure chamber $R_4$, and a relief valve 45 for determining a maximum value of the hydraulic pressure. Thus, the pressure mechanism 30 is arranged to increase the resistance to relative rotation between the input and output members 12 and 14 in accordance with an increase in vehicle speed.

Assuming that the input member 12 is applied with an input manual torque in steering operation, the cam follower element 24 will act to permit relative rotation between the input and output members 12 and 14 and to effect axial movement of the cam follower element 24 against the load of dish spring 33 in accordance with the driver's steering effort applied to the steering wheel. If the pressure in chamber $R_4$ is below a predetermined level at which power assist is needed, relative rotation between the valve rotor 21 and the valve sleeve 22 will occur in response to the axial movement of cam follower element 24. As a result, the rotary change-over valve will act to establish fluid communication between one of the pressure chambers $R_1$ and $R_2$ in power cylinder 41 and the pressure supply circuit and to establish fluid communication between the other pressure chamber in power cylinder 41 and the exhaust circuit. Thus, the resulting pressure differential across the power piston 41A provides a hydraulic power assist to the driver's steering effort applied to the steering wheel.

If the pressure in chamber $R_4$ increases in accordance with an increase in vehicle speed, the axial movement of cam follower element 24 is restricted in accordance with increase of the pressure in chamber $R_4$ to decrease the relative rotation between the valve rotor 21 and the valve sleeve 22. As a result, the rotary change-over valve will act to decrease the level of hydraulic pressure applied to the power cylinder 41. Thus, the hydraulic power assist to the driver's steering effort will decrease in accordance with increase of the vehicle speed. If the pressure in chamber $R_4$ is in excess of the predetermined level, the cam follower element 24 does not permit relative rotation between the input and output members 12 and 14. Thus, the rotary motion applied to the input member 12 is applied directly to the output member 14 to operate the steering apparatus as a manual gear.

In the construction of the power steering apparatus described above, provision of the cam follower element 24 and the associated pressure mechanism 30 serves to enhance torsional rigidity of the steering apparatus without provision of a conventional torsion bar. As the cam follower element 24 is previously applied with the load of dish spring 33, the initial pressure in chamber $R_4$ of the pressure mechanism 30 can be regulated at a relatively low level. The driver's steering effort can be adjusted in a simple manner by replacement of the dish spring 33.

Although in the above embodiment, the solid cam surfaces 24c, 24c is formed on the head of cam follower element 24, they may be formed on the inner end of input member 12. In such a case, the recessed cam surfaces 12b, 12b are formed in the head of cam follower element 24. It is also noted that the valve rotor 21 may be replaced with an independent valve rotor integrally connected to the input member 12. Furthermore, the secondary source of fluid under pressure for the pressure mechanism 30 may be arranged to be responsive to a lateral acceleration of the vehicle, the speed of steering operation and the like.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power steering apparatus for an automotive vehicle including means for actuating a steering mechanism, a primary source of fluid under pressure, a secondary source of fluid under pressure responsive to the vehicle speed for supply of fluid under pressure in proportion to the vehicle speed, and a hydraulic power cylinder for providing a hydraulic power assist to the driver's steering effort applied to the steering mechanism of the vehicle, the power steering apparatus comprising:

a housing;

an input member rotatably mounted in said housing;

an output member, directly connected to said means for actuating said steering mechanism, rotatably mounted in said housing and arranged coaxially with said input member for relative rotation;

a valve rotor integral with said input member;

a valve sleeve rotatably mounted in said housing and arranged in surrounding relationship with said valve rotor, said valve sleeve being connected integrally with said output member to cooperate with said valve rotor for selectively directing fluid under pressure from said primary source to opposite ends of said power cylinder in response to relative rotation between said input and output members;

a cam mechansim including a cam follower element axially movable in an internal axial bore in said output member and being engaged at the inner end thereof with the inner end of said input member in such a manner as to permit relative rotation of said input and output members and to effect axial movement of said cam follower element upon the application of a predetermined manual torque to said input member, said cam follower element including a cam piece axially movable in the inner end portion of said internal axial bore in said output member and directly engaged with the inner end portion of said output member for rotation therewith, and a rod portion extending outwardly from said cam piece and arranged axially movably in said internal axial bore, said cam piece being formed with a pair of solid cam surfaces and said input member being formed in its inner end with a pair of recessed cam surfaces which directly engage with said solid cam surfaces; and a pressure mechanism arranged to apply a hydraulic pressure from said secondary source to the outer end of said rod portion of said cam follower element for increasing a resistance to relative rotation between said input and output members in accordance with increase of the vehicle speed.

2. A power steering apparatus according to claim 1, wherein said pressure mechanism comprises a resilient member arranged to bias said cam follower element toward said input member for applying an intial resistance to relative rotation between said input and output members.

3. A power steering apparatus according to claim 1, wherein said pressure mechanism comprises a piston axially slidable in an end portion of said housing and being operatively engaged with the other end of said cam follower element, and a closure member coupled within the end portion of said housing and associated with said piston to form a pressure chamber in communication with said secondary source of fluid under pressure.

4. A power steering apparatus according to claim 3, wherein said pressure mechanism further comprises a resilient member supported on the inner end of said closure member and being in engagement with said piston for biasing said cam follower element toward the inner end of said input member.

5. A power steering apparatus according to claim 4, wherein said closure member is detachably coupled within the end portion of said housing for replacement of said resilient member.

6. A power steering apparatus according to claim 1, wherein said valve rotor is integrally formed with an intermediate portion of said input member.

7. A power steering apparatus according to claim 1, wherein said output member is in the form of a pinion shaft in mesh with a rack bar which is operatively connected to said hydraulic power cylinder and to the steerable road wheels of the vehicle.

8. A power steering apparatus for an automotive vehicle including a primary source of fluid under pressure, a secondary source of fluid under pressure responsive to the vehicle speed for supply of fluid under pressure in proportion to the vehicle speed, and a hydraulic power cylinder for providing a hydraulic power assist to the driver's steering effort applied to the steering wheel of the vehicle, the power steering apparatus comprising:

a housing;

an input member rotatably mounted in said housing;

an output member rotatably mounted in said housing and arranged coaxially with said member for relative rotation;

a valve rotor integral with said input member;

a valve sleeve rotatably mounted in said housing and arranged in surrounding relationship with said valve rotor, said valve sleeve being connected integrally with said output member to cooperate with said valve rotor for selectively directing fluid under pressure from said primary source to opposite ends of said power cylinder in response to relative rotation between said input and output members;

a cam mechanism including a cam follower element axially movable in an internal axial bore in said output member and being engaged at the inner end thereof with the inner end of said input member in such a manner as to permit relative rotation of said input and output members and to effect axial movement of said cam follower element upon the application of a predetermined manual torque to said input member; and a pressure mechanism including a piston axially slidable in an end portion of said housing, a thrust plate rotatable on said piston and being in engagement with the outer end of said cam follower element, and a closure member coupled within the end portion of said housing to associate with said piston to form a pressure chamber in communication with said secondary source of fluid under pressure.

* * * * *